Dec. 20, 1966  T. C. WILSON  3,292,970
CONVERTIBLE SEAT ASSEMBLY
Filed March 19, 1965  3 Sheets-Sheet 3
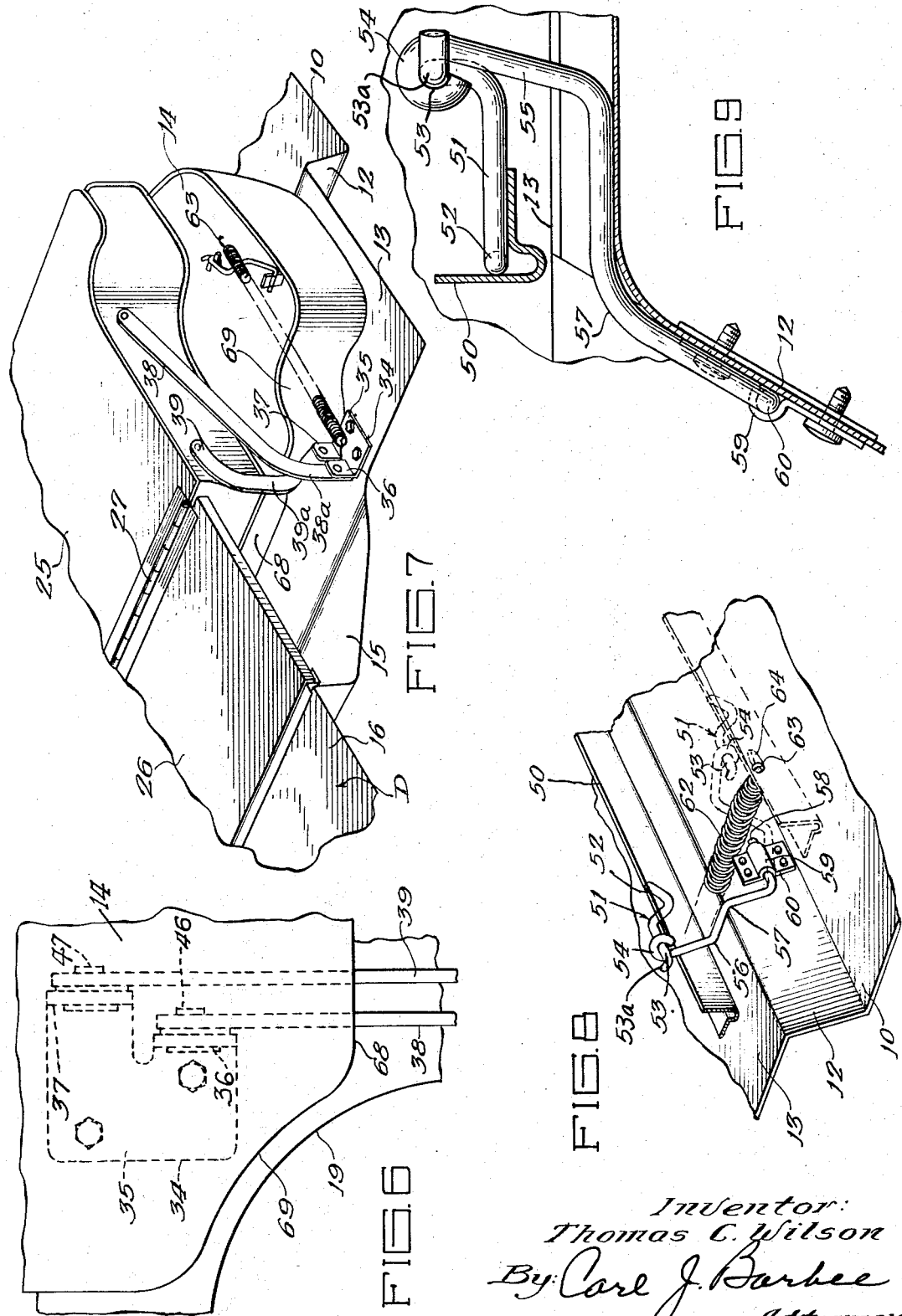
Inventor:
Thomas C. Wilson
By Carl J. Barbee
Attorney ㅤㅤㅤㅤㅤㅤㅤㅤㅤ3,292,970
ㅤㅤㅤㅤㅤCONVERTIBLE SEAT ASSEMBLY
Thomas C. Wilson, Detroit, Mich., assignor to American Motors Corporation, Kenosha, Wis., a corporation of Maryland
ㅤㅤㅤㅤㅤㅤFiled Mar. 19, 1965, Ser. No. 441,283
ㅤㅤㅤㅤㅤㅤㅤㅤ9 Claims. (Cl. 296—66)

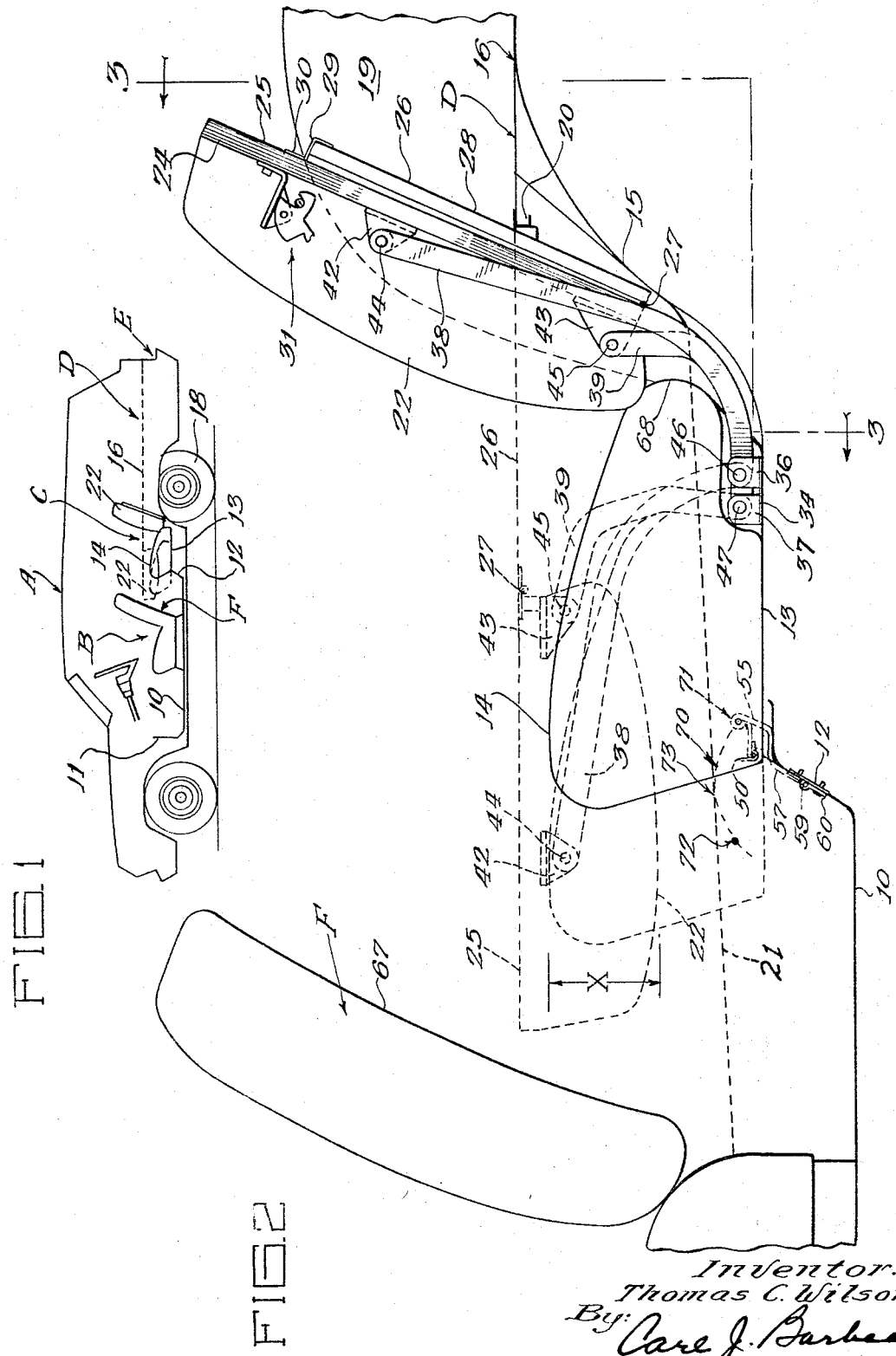

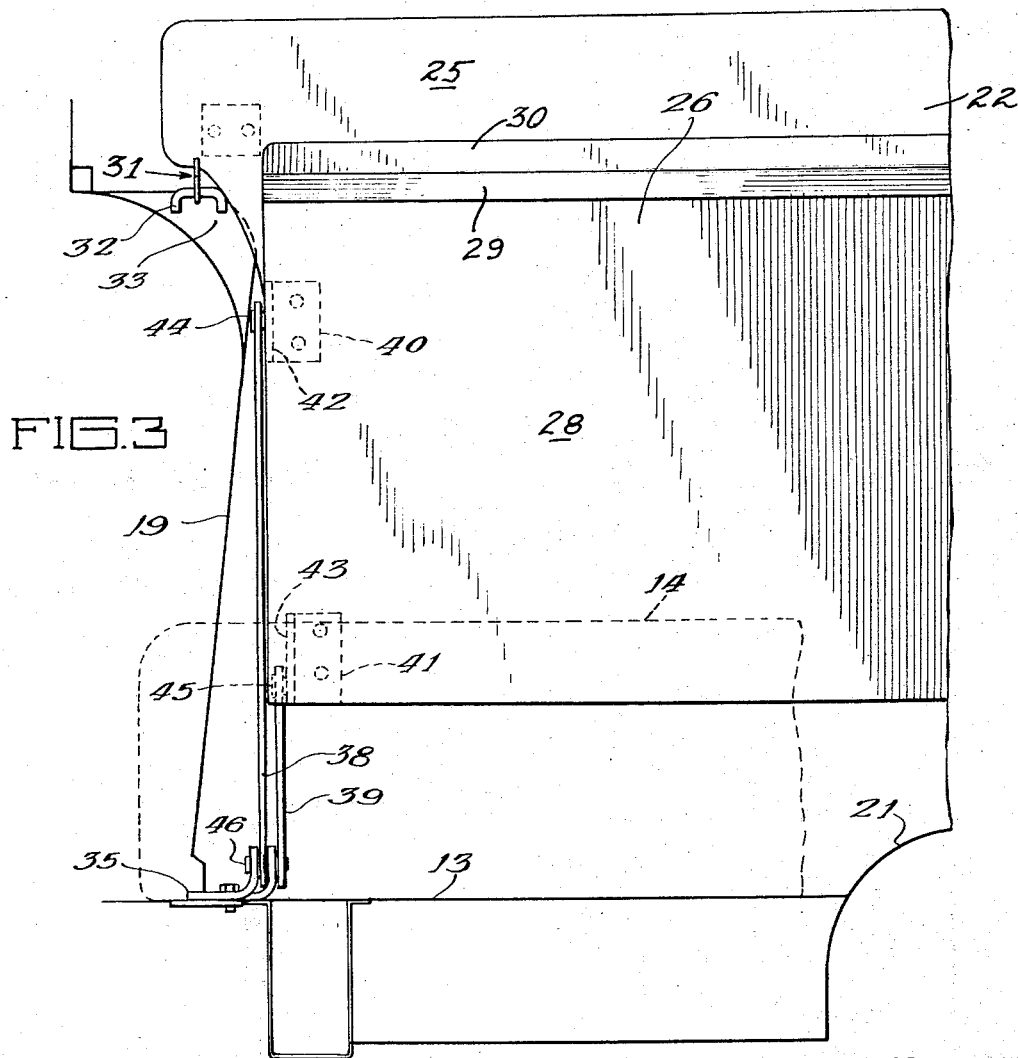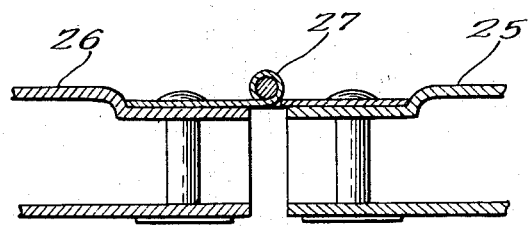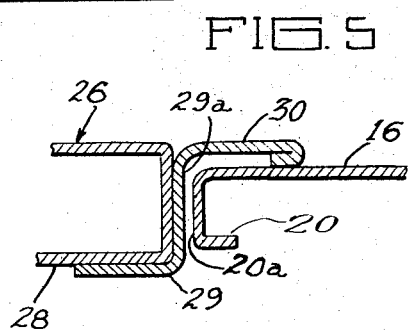

The invention relates to a convertible second seat assembly for an automotive vehicle of the station wagon type, wherein the seat assembly may be quickly converted to provide a cargo carrying floor. Such floor preferably serves as a continuation of another floor area situated rearwardly of the second seat assembly.

Numerous types of convertible seat assemblies have been proposed for use in a station wagon type of vehicle wherein the rear wall of the second back rest becomes a floor section upon folding the back rest to a horizontal position.

It has been proposed to provide a convertible second seat assembly in which the seat cushion remains stationary and the back rest is folded forwardly against the seat cushion resulting in a floor section which is an extension of a presently existing floor. It has also been proposed to provide a convertible second seat assembly in which the seat cushion swings 180° about a horizontal axis permitting its underside to become a floor section which is additional to the floor section provided by the folding back rest. It has further been proposed to provide a convertible second seat assembly in which the back rest is hingedly connected to the seat cushion and the back rest has a hatch hingedly connected thereto which serves as a floor section when the back rest is folded against the seat cushion.

It is herein proposed to provide a second seat assembly which is convertible so as to provide a continuous cargo carrying floor which extends from the tailgate to the rear wall of the back rest of the first seat assembly. It is proposed to provide a convertible second seat assembly in which the back rest is pivotally carried on link members and the seat cushion is separate therefrom, however, the seat cushion moves forwardly as a result of the folding of the back rest to provide a better vertical support for the back rest when it is functioning as a cargo carrying floor section. Although the seat cushion is unattached with reference to the back rest, it is only necessary to manually grasp the back rest and move it forwardly in a lowering direction in order to effect the forward shifting of the seat cushion and upon return movement of the back rest to upright position, spring means are provided for automatically returning the seat cushion to its normal position for passenger occupancy. It is further proposed to provide a convertible seat assembly in which the linkage mechanism at either end of the back rest is inobtrusive and substantially hidden from view.

The principal object, then, is to provide a convertible second seat assembly having the advantages just previously described.

Another object is to provide a convertible second seat assembly in which the links which carry the back rest for lowering purposes also function to induce forward movement of the seat cushion during lowering of the back rest and also serve to restrain the rear edge of the seat cushion from "rearing up" under downward back rest load.

Another object is to provide a seat cushion hingedly mounted at its forward end in such a manner as to assist in forward movement of the seat cushion after it has traveled "beyond center" during lowering of the back rest.

Another object is to provide a convertible second seat assembly in which spring means are provided for retracting the seat cushion during raising of the back rest to upright position.

Another object is to provide a convertible second seat assembly in which the seat cushion rests directly on the floor pan and during forward or reverse movement thereof, the front edge is elevated slightly to prevent undue scraping on the floor pan.

Another object is to provide a convertible second seat assembly in which there is no reduction in seat cushion width or comfort to accommodate the linkage to fold same.

Other objects and advantages of the invention will be apparent from the ensuing specification and appended drawings in which:

FIGURE 1 is a side elevational schematic view of an automotive vehicle employing the convertible second seat assembly.

FIGURE 2 is an enlarged fragmentary side elevational view, generally schematic, of the convertible second seat assembly and showing only a portion of the first seat assembly.

FIGURE 3 is a fragmentary view taken on the irregular line 3—3 of FIGURE 2 and with the seat cushion shown in dotted outline.

FIGURE 4 is a detail sectional view of the hinging connection between the back rest and the hatch associated therewith.

FIGURE 5 is a sectional detail view of the hatch in engagement with the floor pan.

FIGURE 6 is a fragmentary detail plan view with the back rest removed and showing a portion of the seat cushion and one of the link mounting brackets in dotted lines.

FIGURE 7 is a fragmentary perspective schematic view showing one end of the second seat assembly in cargo carrying position.

FIGURE 8 is a fragmentary perspective schematic view of one of the hinging mechanisms at the forward end of the seat cushion.

FIGURE 9 is a fragmentary sectional view of the hinging mechanism of FIGURE 8.

Referring briefly to FIGURE 1, there is shown an automotive vehicle A of the type usually identified as a station wagon. The vehicle includes a first or front seat assembly B and a convertible second seat assembly C. Rearwardly of the second seat assembly is a cargo carrying floor D. When the second seat assembly is converted so as to provide additional cargo carrying floor area, as shown in dotted lines in FIGURE 1, a continuous floor is provided which extends from the tailgate location E to the rear wall of the first back rest F.

The vehicle body includes a floor pan which extends throughout a substantial portion of the length of the vehicle and includes the forward section 10 which extends from the dash panel 11 to the riser wall 12. The floor pan then continues with the elevated section 13 which supports the seat cushion 14 of the second seat assembly. Referring to FIGURE 2, the floor pan continues angularly upward at 15 to the ultimate level, indicated at 16 which then continues to the rearward end of the vehicle. This level is dictated by the rear axle and differential assembly (not shown) which is situated beneath the floor pan and which drives the rear wheels 18. To accommodate the rear wheels the opposite side walls of the vehicle body are provided with wheel house panels 19 which project to some extent into the interior of the vehicle. Extending lengthwise of the vehicle body at the center line thereof is a tunnel 21 (indicated by a dotted line showing in FIGURE 2) which accommodates the transmission and other drive shaft components (not shown) leading to the rear axle assembly. The underside of the seat cushion 14 is recessed from front to rear (not shown) so as to clear the tunnel.

The rearward floor section D terminates at its forward end with a downwardly turned flange 20 which extends across the width of the vehicle from one wheel house panel 19 to the opposite wheel house panel thereby, in effect, providing a ledge which extends throughout the width of the vehicle floor D. The back rest 22 includes the resilient pad 23 which is mounted on a suitable frame 24 which defines the outline of the back rest. The back wall 25 of the back rest is anchored to the frame and may be of generally rigid material and flat so as to function as a floor when the back rest is folded down to horizontal position as shown in dotted lines in FIGURES 1 and 2. A hatch 26 is hingedly mounted along the lower margin of the back rest frame and extends throughout the length of the back rest. The hinge 27 preferably extends throughout the length of the hatch, as best shown in FIGURE 7. When the back rest is in upright position the rear wall 28 of the hatch rests against the floor ledge 20. An angle iron 29 is secured to the upper edge of the hatch and extends throughout the length thereof providing flange 30 which rests on the upper surface of the ledge 20 when the back rest is folded down. A latching mechanism 31, of conventional construction, releasably engages a U-shaped keeper 32 (see FIGURE 3) which is anchored to the forward portion 33 of the wheel house panel. A similar latching mechanism, keeper and wheel house panel is located at the opposite end of the back rest. A bracket 34 has a flange portion 35 which is bolted to floor section 13 and upwardly turned tongues 36 and 37 serve as pivotal mountings for outer and inner links 38 and 39 respectively. The tongues are offset, as best indicated in FIGURE 6, to permit the side-by-side relationship of the inner and outer links so that they swing clear of each other during folding of the back rest. Brackets 40 and 41 are anchored to the seat back frame and have forwardly projecting flanges 42 and 43 for pivotally receiving the upper ends of the links 38 and 39 respectively on pivot pins 44 and 45. The lower ends of the links are carried on pivot pins 46 and 47. At the opposite end of the back rest a similar assemblage of bracket 34, links 38 and 39, brackets 40 and 41, pivot pins 44, 45, 46 and 47 and so on are provided for carrying that end of the back rest.

As previously mentioned, the underside of seat cushion 14 rests on the surface of floor section 13 and the seat cushion is independent of the back rest. The forward portion of the seat cushion, however, is hingedly connected to the riser wall 12 of the floor pan, as best shown in FIGURES 8 and 9. The forward and lower edge of the seat cushion is provided with a frame member 50, of angular cross section, and extending throughout the length of the seat cushion. A hinge pintle 51 may be formed of a rod having one end 52 welded to frame member 50 and the other end bent so as to extend crosswise of the vehicle and providing the pintle 53 which extends through the eye 54 of hinge arm 55. The hinge arm 55 is bent at 56 and 57 to follow the floor pan contour and the inwardly turned end 58 serves as a pintle which is pivotally received in the bearing portion 59 of bracket 60, the bracket being anchored to the floor pan riser wall 12. Hinge pintle 53 is bent at the end 53a to prevent the pintle from becoming disengaged from the eye 54 after the hinge arm 55 is installed in the bearing portion of bracket 60. FIGURE 8 shows the hinge mechanism in extended as well as retracted position—the extended position being that in which the seat cushion has moved to its forward most position. A tension spring 62 has one end 63 received in slot 64 in seat frame 50 and the other end 65 anchored to bracket 34. The spring 62 continuously urges the seat cushion in a rearward or retracted direction. At the opposite end of the seat cushion a similar assemblage of hinging mechanism and tension spring are provided for performing the same functions.

When the convertible seat assembly is in upright position, for passenger occupancy, as shown in solid lines in FIGURE 2, the seat cushion is in retracted position and the latching mechanisms 31 are engaged with keepers 32. In order to convert the seat assembly to cargo carrying position, it is only necessary to release the latches 31 from the keepers and then to manually grasp the upper edge of the back rest and fold (push) it downwardly until pad 23 is compressed against the resilient seat cushion 14. The extent of interference between pad and cushion is indicated by the dimension X in FIGURE 2 and is such that the seat cushion provides a suitable vertical support for the resulting floor section formed by the rear wall 25 of the back rest. During the lowering of the back rest, the underside 26 of the hatch rests by gravity on floor ledge 20 until upper edge of the hatch—the surface 29a of the angle iron—drops down into engagement with the front face 20a of the floor ledge 20 (as best shown in FIGURES 2, 5 and 7) and the underside of flange 30 overhangs and rests upon the upper surface of the floor ledge. The hatch then becomes the intermediate floor section, bridging the area between floor sections 25 and D. Due to the resistance occasioned by the compressing of pad 22 with reference to seat cushion 14, the hatch is under compression against floor ledge 20, thereby affording a substantially continuous horizontally floor extending from the tailgate of the vehicle to the rear surface 67 of the first back rest F.

During the lowering of the back rest, the curved portions 38a and 39a of the links 38 and 39 (at each end of the back rest) engage the rear wall 68 of the seat cushion thereby pushing the seat cushion forwardly to the extended position shown in dotted lines in FIGURE 2. Viewing FIGURE 6, it will be noted that the seat cushion has a recessed area 69 (at each end), occasioned because of the contour of the wheel housing panels 19 and permitting the rear wall 68 of the seat cushion to extend far enough back so as to be in proximity to and engageable by the curved portions of the links. During the forward pushing of the seat cushion by the links, tension in the springs 62 increases sufficiently to effect the return of the seat cushion to retracted position when the back rest is raised to upright position. When the seat cushion is pushed to the maximum forward position, then the links (particularly the longer or outer links 38) overlie the seat cushion from front to rear, thereby serving to restrain the seat cushion from any tendency to "rear up" from the floor surface 13. Thus the extent of overhang of the front portion of the cushion beyond riser wall 12, when the seat cushion is in maximum forward position (see FIGURE 2) is of no consequence due to the vertical restraint imposed on the cushion by the links.

While the underside of the seat cushion, at the rear end thereof, rests on the floor pan 13, the forward underside end of the seat cushion does not drag on the floor pan due to the hinging connections to the riser wall 12, as previously described herein. Viewing FIGURE 2, as the seat cushion is pushed forwardly, the forward end thereof describes an arc as indicated by the numeral 70 wherein the forward underside end of the seat cushion is lifted off the floor during the extent of the movement of pintles 53 between the start and stop positions, indicated by the numerals 71 and 72 in FIGURE 2. The hinge arm pintles 58 are situated approximately midway (lengthwise of the vehicle) between the two positions 71 and 72 so that when the seat cushion reaches extreme forward position, the underside of the seat cushion is again flat against floor section 13. When the seat cushion goes beyond the mid-point 73 of its arc of travel, then the weight of the forward end of the seat cushion assists by gravity in the forward movement of the seat cushion.

I claim:
1. In combination with a vehicle body having a first floor section at one level; a seat assembly convertible into a second floor section at a higher level, said seat assembly including:

(a) a seat cushion having its underside overlying and supported on the first floor section;
(b) a back rest situated at one end of the seat cushion when in upright position;
(c) links at opposite ends of the back rest and pivotally carrying the back rest relative to the vehicle body;
(d) said links being situated behind and within the lateral dimensions of the seat cushion, whereby to engage the rear wall thereof and push the seat cushion forwardly when the back rest is swung forwardly into a substantially horizontal position to form the second floor section.

2. In combination with a vehicle body having a first floor section at one level; a seat assembly convertible into a second floor section at a higher level, said seat assembly including:
(a) a seat cushion having its underside overlying and supported on the first floor section;
(b) a back rest situated at one end of the seat cushion when in upright position;
(c) links at opposite ends of the back rest and pivotally carrying the back rest relative to the vehicle body;
(d) said links being situated behind and within the lateral dimensions of the seat cushion, whereby to engage the rear wall thereof and push the seat cushion forwardly when the back rest is swung forwardly into a substantially horizontal position to form the second floor section;
(e) means connecting the seat cushion to the vehicle body for automatically moving the seat cushion rearwardly when the back rest is returned to upright position.

3. In combination with a vehicle body having a first floor section at one level; a seat assembly convertible into a second floor section at a higher level, said seat assembly including:
(a) a seat cushion having its underside overlying and supported on the first floor section;
(b) a back rest situated at one end of the seat cushion when in upright position;
(c) links at opposite ends of the back rest and pivotally carrying the back rest relative to the vehicle body;
(d) said links being situated behind and within the lateral dimensions of the seat cushion, whereby to engage the rear wall thereof and push the seat cushion forwardly when the back rest is swung forwardly into a substantially horizontal position to form the second floor section;
(e) the pivotal connections of the links to the vehicle body being situated forwardly of the rear wall of the seat cushion and the links, when the back rest is in upright position, having portions extending rearwardly from the pivotal connections and other portions merging with and extending angularly upwardly from the rearwardly extending portions.

4. A vehicle body and convertible seat assembly as set forth in claim 3 wherein the links overlie the rear wall and upper surface of the seat cushion when the back rest is in substantially horizontal position so as to restrain the rearward portion of the seat cushion from rearing up when the back rest is in horizontal position.

5. A vehicle body having a floor section at one level; a seat cushion having its underside overlying, resting upon and supported on said floor sections; means for moving said seat cushion forward a predetermined distance, said means including a back rest pivotally mounted on the vehile body for swinging movement from upright to a substantially horizontal position overlying and resting upon the seat cushion; hinge means connecting the front end of the seat cushion to the vehicle body, whereby the front end of the seat cushion swings upwardly away from the floor section as the seat cushion moves forwardly relative to the floor section, the axis of said hinge means being located substantially midway of the range of forward movement of the seat cushion, whereby the front end of the seat cushion is at a substantially common height level relative to the floor section at either end of the range of its movement.

6. In combination with a vehicle body having a first floor section at one level; a seat assembly convertible into a second floor section at a higher level, said seat assembly including:
(a) a seat cushion having its underside overlying and supported on the first floor section;
(b) a back rest situated at one end of the seat cushion when in upright position;
(c) links at opposite ends of the back rest and pivotally carrying the back rest relative to the vehicle body;
(d) said links being situated behind and within the lateral dimensions of the seat cushion, whereby to engage the rear wall thereof and push the seat cushion forwardly when the back rest is swung forwardly into a substantially horizontal position to form the second floor section;
(e) hinge means connecting the front end of the seat cushion to the vehicle body, whereby the front end of the seat cushion swings upwardly away from the first floor section as the seat cushion is pushed forwardly by the links.

7. A vehicle body and convertible seat assembly as set forth in claim 6 wherein the seat cushion is separate from the back rest and the underside of the back end of the seat cushion rests on the first floor section and remains at a substantially common height level during movement of the seat cushion throughout its range of forward movement.

8. In combination with a vehicle body having a first floor section at one level; a seat assembly convertible into a second floor section at a higher level, said seat assembly including:
(a) a seat cushion having its underside overlying and supported on the first floor section;
(b) a back rest situated at one end of the seat cushion when in upright position;
(c) links at opposite ends of the back rest and pivotally carrying the back rest relative to the vehicle body;
(d) said links being situated behind and within the lateral dimensions of the seat cushion, whereby to engage the rear wall thereof and push the seat cushion forwardly when the back rest is swung forwardly into a substantially horizontal position to form the second floor section;
(e) hinge means connecting the front end of the seat cushion to the vehicle body, whereby the front end of the seat cushion swings upwardly away from the first floor section as the seat cushion is pushed forwardly by the links;
(f) spring means connected between the seat cushion and vehicle body for automatically returning the seat cushion rearwardly when the back rest is returned to upright position.

9. A vehicle body and convertible seat assembly as set forth in claim 8 wherein the seat cushion is unattached with reference to the back rest.

References Cited by the Examiner
UNITED STATES PATENTS 2,997,335  8/1961  May _____ 296—66

References Cited by the Applicant
UNITED STATES PATENTS 2,981,311  4/1961  Hacker.
3,097,881  7/1963  Aguilar.
3,113,801  12/1963  Caley.
3,114,570  12/1963  Farrow et al.

BENJAMIN HERSH, *Primary Examiner.*

J. H. BRANNEN, *Assistant Examiner.*